(12) United States Patent
Würfel

(10) Patent No.: US 11,059,116 B2
(45) Date of Patent: Jul. 13, 2021

(54) METHOD AND APPARATUS FOR GEAR SKIVING

(71) Applicant: Liebherr-Verzahntechnik GmbH, Kempten (DE)

(72) Inventor: Robert Würfel, Kempten (DE)

(73) Assignee: LIEBHERR-VERZAHNTECHNIK GMBH, Kempten (DE)

(*) Notice: Subject to any disclaimer, the term of this patent is extended or adjusted under 35 U.S.C. 154(b) by 0 days.

(21) Appl. No.: 16/126,792

(22) Filed: Sep. 10, 2018

(65) Prior Publication Data

US 2019/0076944 A1    Mar. 14, 2019

(30) Foreign Application Priority Data

Sep. 8, 2017  (DE) .................. 10 2017 120 788.0

(51) Int. Cl.
| | |
|---|---|
| *B23F 5/16* | (2006.01) |
| *B23Q 17/09* | (2006.01) |
| *B23F 23/12* | (2006.01) |
| *B23F 23/00* | (2006.01) |
| *G01B 5/008* | (2006.01) |
| *G01B 5/24* | (2006.01) |

(52) U.S. Cl.
CPC ............ *B23F 5/163* (2013.01); *B23F 23/006* (2013.01); *B23F 23/1218* (2013.01); *B23Q 17/0914* (2013.01); *G01B 5/008* (2013.01); *G01B 5/24* (2013.01); *G05B 2219/36198* (2013.01)

(58) Field of Classification Search
CPC .... B23F 5/163; B23F 23/006; B23F 23/1218; B23Q 17/0914; G05B 19/40938; Y10T 409/00–109699
See application file for complete search history.

(56) References Cited

U.S. PATENT DOCUMENTS

| | | | |
|---|---|---|---|
| 10,018,459 B2 | 7/2018 | Wuerfel | |
| 2009/0064518 A1* | 3/2009 | Finkenwirth | B23F 23/1218 33/501.13 |
| 2013/0280990 A1* | 10/2013 | Geiser | B23F 5/04 451/47 |
| 2015/0081083 A1* | 3/2015 | Kreschel | B23F 23/12 700/160 |
| 2017/0235283 A1* | 8/2017 | Saito | G05B 19/4097 700/98 |
| 2017/0326662 A1 | 11/2017 | Philippin et al. | |
| 2018/0117692 A1 | 5/2018 | Sobczyk | |

(Continued)

FOREIGN PATENT DOCUMENTS

| | | |
|---|---|---|
| DE | 222521 A1 | 5/1985 |
| DE | 102014007646 A1 | 11/2015 |

(Continued)

*Primary Examiner* — Nicole N Ramos
(74) *Attorney, Agent, or Firm* — McCoy Russell LLP

(57) ABSTRACT

The present disclosure relates to a method for gear skiving a workpiece, wherein: in a first step, the geometry of a tool, in particular of a skiving wheel, is measured for the machining of the workpiece in a state clamped in an apparatus for gear skiving machining; and in a subsequent further step, machining kinematics are determined for the gear skiving in dependence on the measured geometry of the tool characterized in that the absolute location of a cutting edge of the tool in the apparatus is determined in the first step.

11 Claims, 5 Drawing Sheets

(56) References Cited

U.S. PATENT DOCUMENTS

2018/0185975 A1* 7/2018 Stach .................. B23F 23/12
2019/0076945 A1* 3/2019 Schmezer ............ B23F 21/026

FOREIGN PATENT DOCUMENTS

DE    102014018328 A1    6/2016
DE    102015104310 A1    9/2016
DE    102016216901 A1    3/2018

* cited by examiner

METHOD AND APPARATUS FOR GEAR SKIVING

CROSS REFERENCE TO RELATED APPLICATIONS

The present application claims priority to German Patent Application No. 10 2017 120 788.0, entitled "METHOD AND APPARATUS FOR GEAR SKIVING", and filed on Sep. 8, 2017. The entire contents of the above-listed application is hereby incorporated by reference for all purposes.

The present disclosure relates to a method and to an apparatus for gear skiving. Such an apparatus is typically a manufacturing machine such as a skiving machine or the like that is suitable to generate gears or other structures periodically repeating at the circumference of a component with a high quality.

In gear skiving, the workpiece to be machined is arranged on a workpiece spindle and the skiving wheel (tool) that cooperates in a cutting manner with the workpiece is arranged on a tool spindle. The two spindles are driven in accordance with a coupling ratio during gear skiving so that the cutting teeth of the skiving wheel machine the tooth flank of the workpiece in a cutting manner.

It is necessary for the high quality required in the gear cutting to know the geometry of the skiving wheel and the location of the skiving wheel as exactly as possible in the manufacturing machine.

It is the case in manufacturing machines in accordance with the prior art that skiving wheels are measured on measurement machines outside the machine. This inter alia brings along the following disadvantages:
a) suitable apparatus must be available;
b) an additional work effort arises due to the measurement since an operator has to place the skiving wheel on the apparatus to measure it there; and
c) in addition to the geometry of the skiving wheel itself, the tool mount and the tool holder also play a role with respect to the location of the skiving wheel in the manufacturing machine. These influences cannot be detected in an external measurement.

A possibility of indirectly recognizing deviations in the geometry of the skiving wheel and/or in the location of the skiving wheel in the machine is to skive a workpiece, to measure it (in the manufacturing machine or outside it on a separate measurement unit), to determine the deviations, and to adapt the machining kinematics for following workpieces and/or machining strokes such that the deviations are at least partially compensated.

This is disadvantageous in that such a method produces reject parts, in particular when the workpieces are skived in only one cut per flank since there is no possibility in this case to measure and correct deviations before the last cut. An application for only one cut per flank is in particular the use of gear skiving as a hard/fine finishing process (hard skiving) The workpieces are in particular already largely machined and expensive in this case so that rejects are to be avoided.

It is accordingly the aim of the present disclosure to provide an apparatus for gear skiving that overcomes the above-stated disadvantages. This is done by a method for gear skiving a workpiece, wherein: in a first step, the geometry of a tool, in particular of a skiving wheel, is measured for the machining of the workpiece in a state clamped in an apparatus for gear skiving machining; and in a subsequent further step, machining kinematics are determined for the gear skiving in dependence on the measured geometry of the tool, wherein the absolute location of a cutting edge of the tool in the apparatus is determined in the first step. The aim of the present disclosure is further achieved by an apparatus for gear skiving a workpiece. Embodiments of the apparatus and method are listed in the dependent claims.

The machining kinematics during gear skiving will be described in more detail in the following:

The coupling ratio between the tool spindle axis and the workpiece spindle axis is given by the tooth number ratio of the tool and the workpiece and describes the ratio of the tool spindle and the workpiece spindle during the machining, but still without taking the axial feed along the workpiece speed into account.

The differential feed describes the additional rotation of the workpiece determined by the axial feed along the workpiece due to the lead of the workpiece. This additional rotation is necessary to generate the helix angle at the workpiece.

The coupling position describes a set of values for the rotational position of the tool spindle, for the rotational position of the workpiece spindle, and the position in the axial direction.

The center distance describes the distance between the tool spindle axis and the workpiece spindle axis.

The axial cross angle is here defined as the angle by which the tool spindle is inclined with respect to the workpiece spindle.

The rake face offset denotes a shift of the tool along the tool spindle axis.

The gap geometry generated during the gear skiving at the workpiece depends on the shape of the cutting edge, on the location of the cutting edge, and on the machining kinematics. The cutting edge arises in that a rake plane is ground at the toothed skiving wheel. This rake face can be designed, for example, as a step cut or as a conical cut. The cutting edge relevant for the achieved gap geometry is produced by calculation by cutting the flanks of a skiving wheel tooth having the rake face at this tooth. This cut delivers a curve in space. This curve, observed in a coordinate system that is fixedly linked to the skiving wheel in which, for example, the z axis coincides with the axis of rotation of the skiving wheel and thus with the tool spindle axis during the machining, is designated as the spatial extent of the cutting edge in the sense of the present disclosure. If the cutting edge is rotated about the axis of rotation and/or is displaced along the axis of rotation, the spatial extent of the cutting edge does not change in the sense of the present disclosure; only the location of the cutting edge changes. The location of the cutting edge thus determines the position of the cutting edge in the axial direction and its angular location, both with respect to the axis of rotation.

In accordance with the method in accordance with the present disclosure for the gear skiving of a workpiece, in a first step the geometry of a tool for machining the workpiece is measured in a state clamped in an apparatus for gear skiving machining. The tool can be a skiving wheel. In a subsequent further step, machining kinematics are determined for the gear skiving in dependence on the measured geometry of the tool. The method is characterized in that the absolute location of a cutting edge of the tool in the apparatus is determined in the first step.

In that the absolute location of a cutting edge of the tool in the apparatus is also determined in the first step, it is possible that the machining kinematics are matched to the absolute location of the cutting edge.

Errors in a preceding measurement of a skiving wheel or irregularities in the tool mount or in the tool holder can thus be compensated during the gear skiving.

The location is called absolute if it relates to the position in the tool mount in the apparatus. The axial position may be related to the contact surface of the tool mount. The rotational position can be related to a defined direction in the apparatus.

In accordance with an optional modification of the method, the spatial extent of the cutting edge is additionally determined in the first step beside the determination of the location. Even better machining kinematics can thereby be generated.

In accordance with a preferred embodiment of the present disclosure, the tool is a skiving wheel and the geometry of the skiving wheel is, with one or more of the following geometrical parameters being measured at the skiving wheel:

a) an outside diameter of the skiving wheel at one or more axial positions of the skiving wheel;
b) a tooth thickness of the skiving wheel at one or more axial positions of the skiving wheel;
c) a profile line of the skiving wheel;
d) a tooth trace of the skiving wheel;
e) an extent of the cutting edge of the skiving wheel;
f) a location of the rake face and/or its orientation, in particular its rake angle and step angle; and/or
g) the location of the tool, preferably a rotational position of the skiving wheel, preferably the rotational position of one or more teeth on the skiving wheel.

The measurement of these parameters can be utilized to determine the absolute location and/or the spatial extent of the cutting edge.

This determination can take place in the following manner, for example:

a direct measurement of the cutting edge, with the measurement preferably taking place along the cutting edge; and by measurement of the rake face for determining the location and orientation and by a cutting thereof by calculation with the profile of the skiving wheel tooth, with the profile of the skiving wheel tooth being able to be determined by a profile line measurement and/or by a tooth thickness measurement or with the theoretical profile being calculated in accordance with the tool design.

The machining kinematics may be determined and/or corrected in dependence on the measured geometry of the tool and on an axial feed position of the workpiece.

It is possible in gear skiving to generate modifications, in particular tooth trace modifications, on the workpiece by a change of the machining kinematics during a machining stroke dependent on the axial feed position of the workpiece. If this is the case, the geometry differences of the skiving wheel have slightly different effects at every axial feed position of the workpiece. To compensate this, the above-described compensation of the geometrical differences of the skiving wheel have to be determined separately for each axial feed position. Which modification, in particular which tooth trace modification, at the workpiece should be generated at the different width line positions must be taken into account in the simulation. Corrected machining kinematics that depend solely on the axial feed position of the workpiece are thus produced as the result. This dependence on the axial feed position is independent of the selected axial feed per workpiece rotation. There is in particular no direct dependence on the rotational position of the workpiece and/or on the rotational position of the tool.

In a further embodiment of the present disclosure, the machining kinematics are determined and/or corrected in dependence on the measured geometry of the tool, with the machining kinematics remaining constant during a machining stroke.

If, however the workpiece should originally be machined without any change of the machining kinematics in dependence on the axial feed position of the workpiece, the geometrical differences of the skiving wheel have the same effect on the geometry produced at the workpiece at every axial feed position of the workpiece.

The present disclosure therefore provides a variant that the changes of the machining kinematics required for compensating the measured geometrical differences of the skiving wheel are not changed during the machining stroke. Since the workpiece is generally machined in multiple strokes during gear skiving, it is, however, by all means possible and also sensible to determine the change of the machining kinematics separately for each stroke and to set them accordingly for each stroke.

It is assumed in the method in accordance with the present disclosure that all the skiving wheel teeth are evenly distributed over the circumference of the skiving wheel and that all the cutting edges have the same spatial extent within the framework of a given and/or customary tolerance. It is thereby sufficient to measure the geometry of a single skiving wheel tooth. To improve the measurement result, it is, however, by all means possible to measure more than just one cutting wheel tooth and to average the measurement results.

In accordance with the present disclosure, the machining kinematics determined in dependence on the measured geometry can have no periodic component that occurs recurringly with each revolution of the tool.

In an advantageous further development of the present disclosure, a difference in the tooth thickness, in the profile angle and/or in the root circle radius is compensated by the machining kinematics and/or an angular location of the skived gap is directly specified in the workpiece.

Changes to the magnitudes of the machining kinematics generally mainly have the following influences on the gear teeth produced in gear skiving and on the rake angle and/or clearance angle.

The coupling position determines the angular position at which the gaps are formed in relation to the axis of rotation of the workpiece.

The center distance influences the profile angles at the left and right flanks, the tooth thickness, and the root circle radius.

The axial cross angle and the rake face offset influence the profile angle at the left and right flanks and the tooth thickness, and the rake angle and the clearance angle. The rake face offset additionally slightly influences the root circle radius.

The parameters measured at the skiving wheel within the framework of this present disclosure generally mainly have the following influences on the gear teeth produced in gear skiving and on the rake angle and/or clearance angle.

The outside diameter of the skiving wheel influences the root circle radius. The tooth thickness of the skiving wheel influences the tooth thickness. The rotational position of the skiving wheel influences the angular location of the gaps. The profile line of the skiving wheel influences the profile line of the workpiece. The tooth trace influences the clearance angle and the extent of the cutting edge at the skiving wheel when it is determined by a cutting by calculation of the rake face with the skiving wheel tooth and thus also the profile line. The extent of the cutting edge of the skiving wheel influences the profile line. The location of the rake face and its orientation influence the tooth thickness, the root circle radius, and the profile line, in particular the profile angle error. The reground state influences the tooth thickness, the root circle radius, and the profile line, in particular the profile angle error.

By a change of which parameters of the machining kinematics the influences on the generated gearing of the parameters at the skiving wheel primarily measured within the framework of the present disclosure can be compensated results from the above-named schedule.

In a further optional embodiment of the present disclosure, at least one of the parameters of the machining kinematics such as a coupling position, a center distance, an axial cross angle, and a rake face offset is determined.

An evaluation is furthermore made by means of a check whether a predefined production tolerance can be observed with the skiving wheel and machining kinematics and/or whether technological parameters are within a predefined range, with corresponding workflows being output by the machine in dependence on the result of the check.

The workflows output by the machine can, for example, be action proposals directed to an operator and/or also a plurality of different work processes to be carried out by the machine. It is possible that an operator selects one or more processes suggested by the machine and the machine carries out the correspondingly selected workstep. Provision is likewise made that the machine carries out work processes autonomously.

The results of one or more of these measurements can furthermore be used for determining the absolute location and/or the spatial extent of the cutting edge to set the machining kinematics during gear skiving ideally to the actual geometry of the skiving wheel in order thus to at least partially compensate the deviations of the skiving wheel from the desired geometry or from the desired location in the manufacturing machine in order thus to reduce the deviations resulting at the workpiece.

If at least one of the deviations of the skiving wheel from the desired geometry or from the desired location in the manufacturing machine is so large; or If a combination of at least two deviations is such that the deviation thereby arising at the workpiece can no longer be compensated by an adaptation of the machining kinematics to the extent that the workpiece can be produced within a predefined tolerance, the present disclosure provides initially no longer continuing the machining with this skiving wheel; and drawing the operator's attention to this problem and letting him decide whether production should be carried out with this skiving wheel despite the deviation; or drawing the operator's attention to this problem and prompting him to replace the skiving wheel (manually or via a tool changer that may be present) or to abort the machining; or If an automatic tool changer is present at the manufacturing machine, to automatically expel the skiving wheel from the manufacturing machine and to continue the machining with a different skiving wheel from the tool changer; or If the machining was provided as a dual flank machining, to carry out the machining, optionally after confirmation by the operator, as a single-flank machining if the deviation produced at the workpiece is within a predefined tolerance through a suitable adaptation of the machining kinematics.

In this connection, rake angles and clearance angles can, for example, be understood under technological parameters.

The present disclosure further relates to an apparatus for carrying out the method in accordance with one of the preceding claims that comprises a tool for machining a workpiece, in particular a skiving wheel, a tool mount for receiving the tool, a measurement unit that is configured to measure the geometry of the tool received in the tool mount, and a control unit that is configured to determine machining kinematics for gear skiving in dependence on the measured geometry of the tool. The apparatus is characterized in that the measurement unit is further configured to determine an absolute location of a cutting edge of the tool in the apparatus such that the machining kinematics are also determined on the basis of the absolute location.

The measurement unit can furthermore be configured to determine one or more of the following parameters of the skiving wheel:

a) an outside diameter of the skiving wheel at one or more axial positions of the skiving wheel;

b) a tooth thickness of the skiving wheel at one or more axial positions of the skiving wheel;

c) a rotational position of the skiving wheel, in particular the rotational position of one or more teeth on the skiving wheel, with respect to the tool spindle axis;

d) a profile line of the skiving wheel;

e) a tooth trace of the skiving wheel;

f) an extent of the cutting edge of the skiving wheel;

g) a location of the rake face and/or its orientation, in particular its rake angle and step angle.

The apparatus can furthermore be configured to calibrate the spatial location of the measurement unit with respect to the spindle axis of the skiving wheel in that an inspection collar or a cone of a chuck that is arranged on a spindle axis of the skiving wheel is arranged at the tool mount and/or at the skiving wheel is measured by the measurement unit such that the distance between the measurement unit and the spindle axis can be determined to calibrate the measurement unit accordingly.

The relative location of the measurement unit to the tool spindle in the manufacturing machine is generally not exactly known. It can thus in particular change in time by thermal growth. To be able to compensate such thermal growths, it can be necessary to carry out a calibration of the measurement unit. It can in particular be important to calibrate the distance of the measurement unit from the tool spindle axis, in particular of the measurement sphere center from the tool spindle axis. For this purpose, for example, a ground inspection collar having a known diameter can be provided on the skiving wheel and/or on the tool holder and/or on the tool spindle and is measured by the measurement unit. If, for example, a measuring sensor is used that works in a switching manner, the inspection collar can be sensed with it. The distance between the measurement unit and the tool spindle axis can be determined from this and the measurement unit can be correspondingly calibrated. The distance between the measurement sphere and the tool spindle axis can in particular thereby be determined. Alternatively to an inspection collar produced specifically for this purpose, a cone of a chuck can also be used for mounting the skiving wheel for calibration.

The control unit can furthermore be configured to calibrate the spatial location of the measurement unit with respect to a spindle axis of the skiving wheel, optionally prior to the carrying out of a measurement of the skiving wheel.

Alternatively to an inspection collar, a sphere arranged concentrically to the spindle axis at the spindle axis of the skiving wheel and a cone arranged concentrically to the spindle axis, in particular the hollow shaft cone of the tool mount, can be measured.

Provision can be made that the apparatus is configured to determine the tooth profile of the skiving wheel located in the tool mount by means of the measurement unit with a known tooth profile, in particular a profile angle, of the skiving wheel and to compare it with the known tooth profile to determine the error in the relative location between the measurement unit and the skiving wheel from a deviation between the known tooth profile and the measured tooth profile.

In the event that such an inspection collar and/or cone is not present or cannot be traveled to, the present disclosure provides a further method for determining the relative location between the measurement sphere center and the tool spindle axis. The fact is utilized that an error in the relative location between the measurement sphere center and the tool spindle axis in a measurement of the profile of the skiving wheel teeth results in an error in the measured profile, in particular in the measured profile angle. If the profile of the skiving wheel teeth is known, a measurement of the profile can be carried out in the machine, the measured profile can be compared with the actual profile of the skiving wheel teeth, and errors in the relative location between the measurement sphere center and the tool spindle axis can be determined from the deviation.

The skiving wheel is received in the tool mount during the measurement by the measurement unit. It is thereby possible to determine the geometry and/or location of the skiving wheel and to compensate possible errors that result therefrom. In accordance with the prior art, the determination of the geometry of the skiving wheel takes place, for example, outside the manufacturing machine so that error sources that can occur due to the fastening of the skiving wheel to the tool mount cannot be taken into account.

The present disclosure overcomes this disadvantage and provides a measurement of the skiving wheel in the clamped position in the workpiece mount that is also maintained for the machining of the workpiece. Possible incorrect positions of the skiving wheel in the tool mount are thereby taken into account on the preparation of machining kinematics and a better result is obtained overall.

Provision can furthermore be made in accordance with the present disclosure that the control unit is further configured to carry out a production simulation of a gear skiving on the basis of a measurement of the tool located in the tool mount made by the measurement unit and to generate the machining kinematics for a gear skiving process with the measured tool with reference thereto.

Provision can also be made that a plurality of production simulations are carried out and that the gear skiving process is carried out with reference to those machining kinematics that produced the best results in production tolerance or in other specifications.

The control unit may be configured such that with a known desired tooth profile of the tool, in particular a profile angle of a skiving wheel, the actual tooth profile of the tool located in the tool mount is determined and is compared with the desired tooth profile to determine an error in the relative location between the measurement unit and the tool from a deviation between the desired toot profile and the measured actual tooth profile.

In accordance with an optional further development of the present disclosure, the measurement unit is accordingly further configured to measure the geometry of the skiving wheel and/or to measure the location of the skiving wheel in the apparatus.

Provision can further be made that the measurement unit can be traveled via a mechanism into a working space of the apparatus in which the gear skiving is performed, with the mechanism optionally being fastened to a counter column of the apparatus. Due to the possibility of traveling the measurement into or out of the working space, it can be retracted from the adverse conditions during the gear skiving since cooling fluid and chips are distributed into the surrounding space from the contact region of the workpiece and the skiving wheel (tool), not least due to the high rotational speeds of the tool and the workpiece.

Provision can also be made alternatively to this that the measurement unit is fastened to the machine column or to the machine bed of such a manufacturing machine. In accordance with an optional modification of the present disclosure, the measurement unit is fixedly arranged at the apparatus, optionally at a counter column and/or in a working space of the apparatus in which the gear skiving is performed. A housing protecting the measurement unit can be provided to protect the measurement unit from the above-described adverse influences.

Provision can furthermore be made with a further development of the present disclosure that the apparatus is further configured to implement a relative movement between the skiving wheel and the measurement unit required for the measurement of the skiving wheel by a movement axis of the skiving wheel available during the skiving machining.

The relative movement between the skiving wheel and the measurement unit required for the measurement of the skiving wheel is accordingly generated by those axes of movement which the skiving wheel anyway has for the gear skiving. The necessity of further movement axes and thus of drives associated therewith is thus dispensed with.

Provision can nevertheless also be made in accordance with the present disclosure to implement a relative movement between the skiving wheel and the measurement unit that is required for the measurement of the skiving wheel by a movement axis that is not available during the skiving machining by the skiving wheel. If, for example, the measurement unit is fastened to the machine column, the axes for traveling the machine column do not produce any change of the relative position. Axes not available for the skiving machining can therefore optionally also be used for setting the relative position between the measurement unit and the skiving wheel.

Provision can furthermore be made that the measurement unit is provided with a mechanical measurement sensor and a measurement tip of a measuring probe is optionally provided with a sphere, in particular with a ruby sphere. The measurement by the measurement sensor can take place in a switching or measuring manner.

Such a measurement sensor can be used as a mechanical measurement sensor based on the functional principle that is known from coordinate measurement devices and gear cutting machines. Such measurement sensors are also available in a robust design for installation and use in the machining space of manufacturing machines. A sphere, optionally a ruby sphere, such as is usual with gear cutting measurements, for example, is used as the measurement tip of the measuring probe.

The measurement can furthermore, however, also take place optically, in particular using a laser.

The present disclosure furthermore also includes the implementation according to which the measurement unit is provided with an optical measurement sensor, optionally with a triangulation sensor, an image processing sensor, a confocal sensor, a sensor for a focal variation and/or an interferometer.

Those distance sensors can be used as the optical distance sensor that are likewise known from coordinate measurement devices, in particular triangulation sensors, image processing sensors, focal variation, confocal sensors, or interferometers. To protect such sensors from chips and, where required, cooling agent, they can optionally be correspondingly protected by a casing or housing.

In accordance with a further improved embodiment, the skiving wheel can have both external teeth and internal teeth. It can be monolithic or can be designed with a skiving wheel equipped with replaceable cutting inserts.

The control unit is furthermore optionally configured to set machining kinematics in a subsequent gear skiving process to the actual geometry of the skiving wheel and/or the location of the skiving wheel in the apparatus on the basis of one or more of the parameters of the skiving wheel determined by the measurement unit to compensate deviations of the skiving wheel from the desired geometry and/or from the desired location.

The parameters thus determined or the results of one or more of these measurements can be utilized to set the machining kinematics during gear skiving ideally to the actual geometry of the skiving wheel in order thus to at least partially compensate the deviations of the skiving wheel from the desired geometry or from the desired location in the manufacturing machine so that the deviations resulting at the workpiece are reduced.

In accordance with a further development of the present disclosure, the control unit is further configured to carry out a production simulation of a gear skiving on the basis of a measurement of the skiving wheel located in the tool mount made by the measurement unit and to generate the machining kinematics for a gear skiving process with the measured skiving wheel with reference thereto.

The control unit can furthermore be configured to calibrate the spatial location of the measurement unit with respect to a spindle axis of the skiving wheel, optionally prior to the carrying out of a measurement of the skiving wheel.

Provision can be made that the apparatus is configured to determine the tooth profile of the skiving wheel located in the tool mount by means of the measurement unit with a known tooth profile, in particular a profile angle, of the skiving wheel and to compare it with the known tooth profile to determine the error in the relative location between the measurement unit and the skiving wheel from a deviation between the known tooth profile and the measured tooth profile.

The apparatus can furthermore be configured to calibrate the spatial location of the measurement unit with respect to the spindle axis of the skiving wheel in that an inspection collar that is arranged on a spindle axis of the skiving wheel at the tool mount and/or at the skiving wheel is measured by the measurement unit such that the distance between the measurement unit and the spindle axis can be determined to calibrate the measurement unit accordingly.

Alternatively to an inspection collar, a sphere arranged concentrically to the spindle axis at the spindle axis of the grinding skiving wheel and a cone arranged concentrically to the spindle axis, in particular the hollow shaft cone of the tool mount, can be measured. In accordance with another further development of the present disclosure, the control unit is further configured to evaluate whether a desired production tolerance can be achieved with the skiving wheel measured by the measurement unit or not.

Provision can be made that, if the desired production tolerance cannot be achieved or if at least one of the deviations of the skiving wheel from the desired geometry or from the desired location in the manufacturing machine is so large or a combination of at least two deviations is such that the deviation thereby arising at the workpiece can no longer be compensated by an adaptation of the machining kinematics, the apparatus is configured:

to make an operator of the apparatus aware of this problem via a messaging unit to allow him to decide whether a machining should take place with the skiving wheel despite the deviation;

to make the operator aware of this problem via a messaging unit and to prompt him to replace the skiving wheel manually or via an existing tool changer;

if an automatic tool changer is present at the manufacturing machine, to automatically expel the skiving wheel from the manufacturing machine and to continue the machining with a different skiving wheel from the tool changer;

if the machining was provided as a dual flank machining, to carry out the machining, optionally after confirmation by the operator, as a single-flank machining if the deviation produced at the workpiece is within a predefined tolerance through a suitable adaptation of the machining kinematics; or to abort the machining.

Further features, details, and advantages of the present disclosure can be seen with reference to the explanation of a plurality of examples of the present disclosure in the following in the description of the Figures.

DETAILED DESCRIPTION

Figure 1:
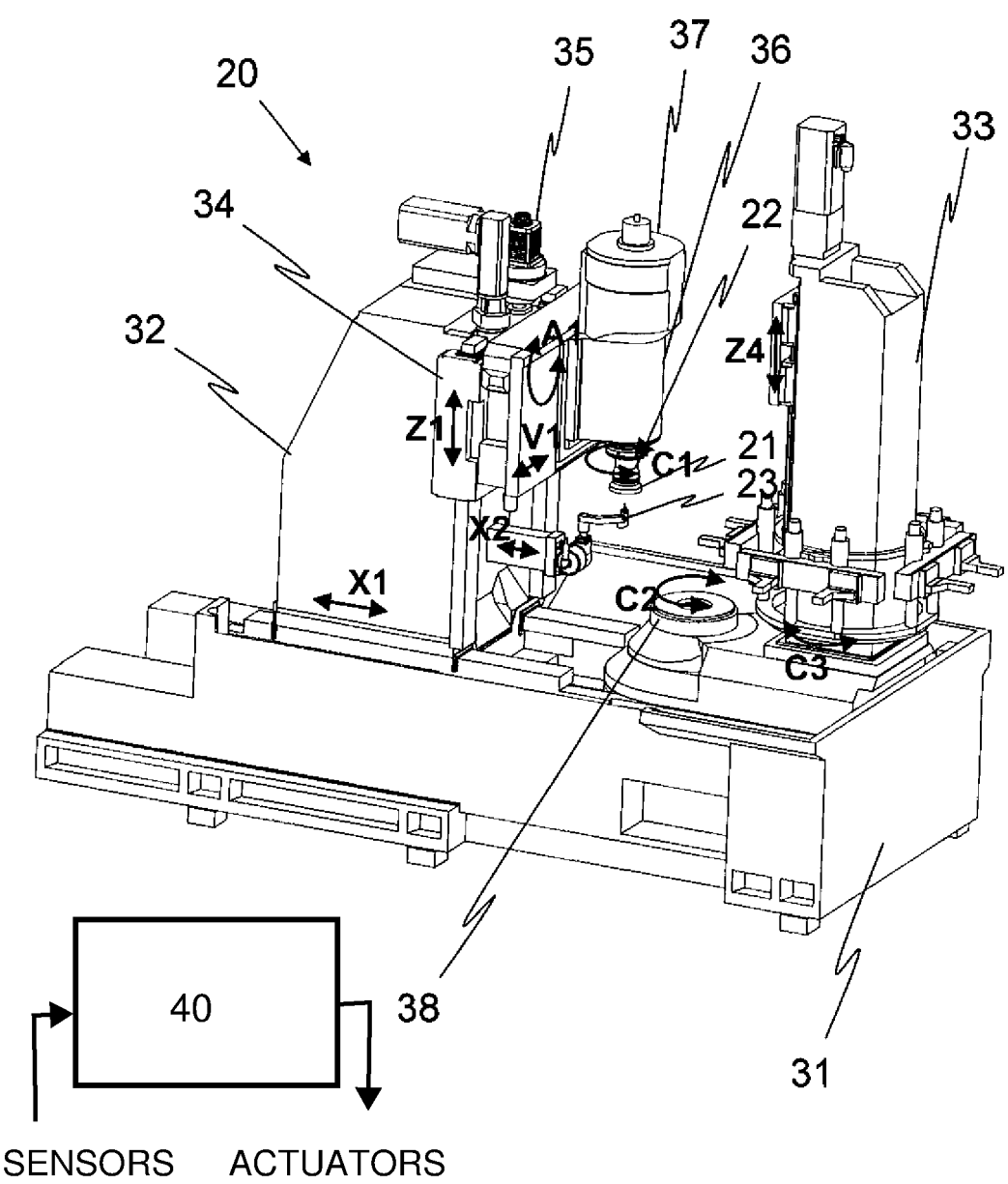
FIG. 1 shows a perspective view of an apparatus for gear skiving in accordance with the present disclosure.

FIG. 1 shows a perspective view of the apparatus 20 in accordance with the present disclosure. A manufacturing machine for gear skiving is shown in which a machine column 32 and a counter column 33 are arranged on a machine bed 31. A machining head 36 that can receive the skiving wheel 21 via a tool mount 22 is fastened to the machine column 32 via a travelable slide 34.

The slide 34 and the machining head 36 fastened thereto can be moved in a plurality of directions. The slide can thus be traveled along the axes X1 and Z1; the machining head 36 can furthermore be traveled along the axis V1. The machining head can furthermore be rotated about an axis A1 in parallel with the axis X1. The axis C1 is the spindle axis of the skiving wheel 21.

The workpiece (not shown) to be machined with the spindle is arranged on the table 38. The workpiece clamping apparatus used is not shown for reasons of better clarity.

Also shown in FIG. 1 is control unit 40. The control unit 40 is shown as a microprocessor with non-transitory memory storing instructions which controls the apparatus 20. The control unit 40 is shown receiving various signals from sensors coupled to the apparatus 20, and transmitting instructions to various actuators. The sensors may include measurement sensor 3, sensor 232 or sensor 233, for example. (See FIGS. 3 and 4). The actuators may include a plurality of drives or the drive 35 for the Z1 axis or the drive 37 for the tool spindle for the performing of the movements, for example.

Figure 2:
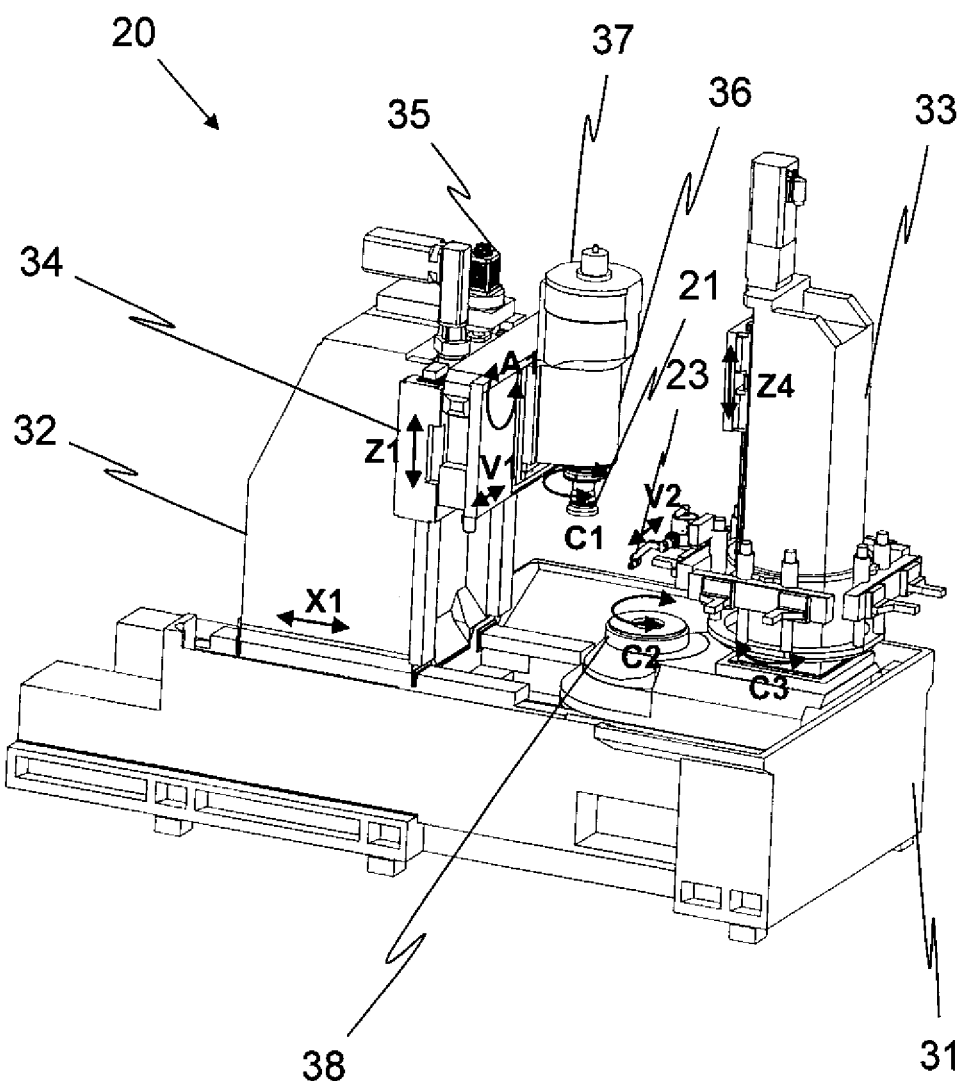
FIG. 2 shows a perspective view of an apparatus for gear skiving in accordance with the present disclosure in accordance with a further embodiment.

FIG. 2 shows a perspective view of a further embodiment of the apparatus 20 in accordance with the present disclosure that, except of the arrangement of the measurement unit 23, substantially corresponds to the apparatus described in FIG. 1. The same reference numerals as in FIG. 1 are also used for identical components.

Unlike FIG. 1, the measurement unit 23 is arranged a the counter column 33 in FIG. 2. A movement axis V2 can also be provided here for the relative movement of the skiving wheel 21 and the measurement unit 23. The delivery to the measurement position of the measurement unit 23 is thus simplified.

As shown in FIG. 1, the apparatus 20 is furthermore provided with a measurement unit 23 that is fastened to the machine column 32 in the present embodiment. The measurement unit 23 has a movement mechanism to enable a relative movement with respect to the skiving wheel 21 received in the tool mount 22. The measurement unit 23 can thus be moved along an axis X2 in parallel with the axis X1 since a relative movement of the two elements in the X direction would not be possible due to the fastening of the measurement unit 23 and the machining head 26 at the machine column 32. The apparatus 20 has a plurality of drives or the drive 35 for the Z1 axis or the drive 37 for the tool spindle for the performing of the movements.

Figure 3:
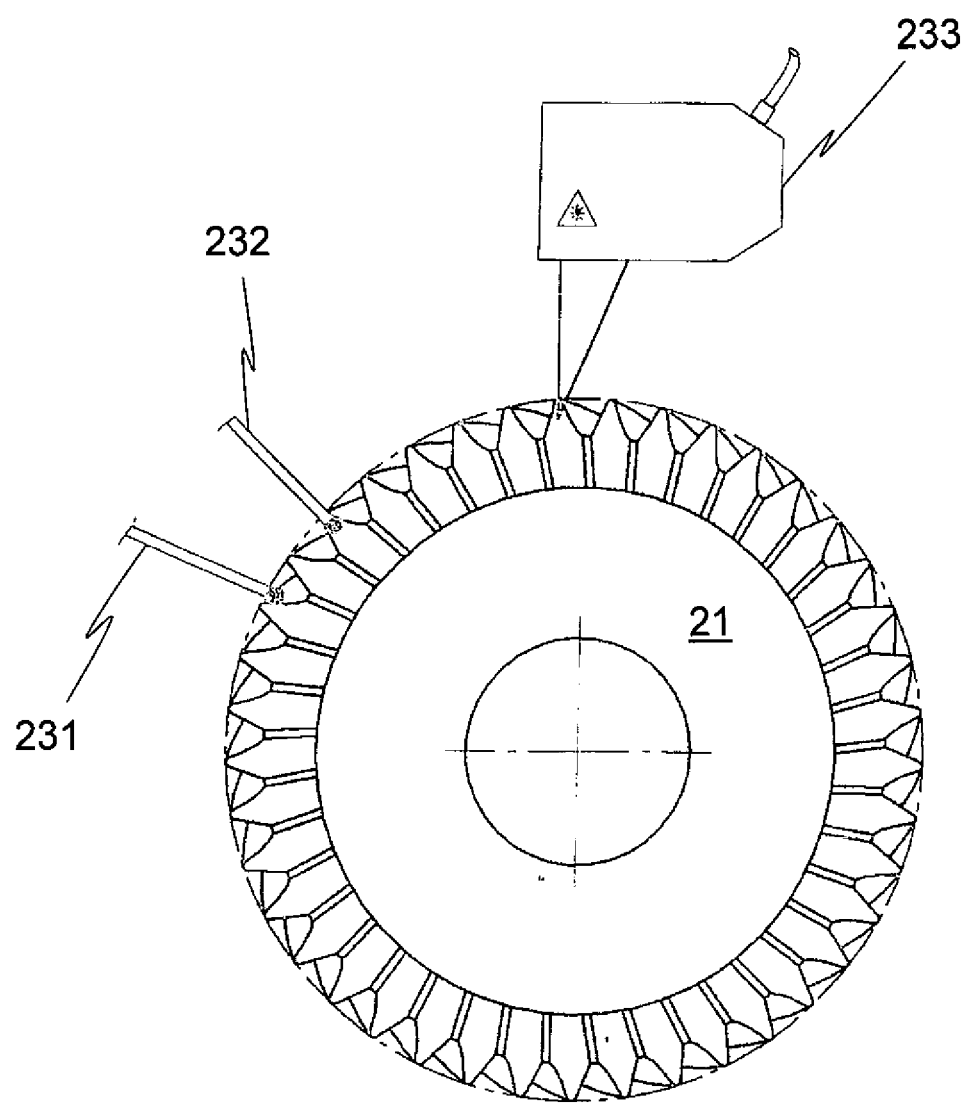
FIG. 3 shows a schematic representation for explaining the calibration of the measurement unit and the skiving wheel or a measurement of the skiving wheel.

FIG. 3 shows a schematic representation of the skiving wheel 21 that is measured with the aid of the measurement unit 23. By way of example for the measurement unit 23, a first probe 231 measures the tooth flank of the skiving wheel 21 and a second sensor 232 measures the rake face. An optical sensor 233, for example a laser, can likewise be part of the measurement unit 23 and can be used for the measurement or for a calibration of the measurement unit 23.

Some examples will be shown in the following for a better explanation of the apparatus:

Example 1

In gear skiving, the exact location and the exact shape of the cutting edge of the skiving wheel are of particular importance to generate the desired profile on the workpiece.

The profile of skiving wheels is typically produced with high accuracy by toolmakers; however, the exact location of the cutting edge only results from the grinding of the rake face. If a skiving wheel is worn, the rake face is sharpened and a new cutting edge is formed. The location and the shape of the cutting edge result from the location and from the orientation of the reground rake face. If the rake face is, for example, described by a plane, the orientation can be defined by a normal vector of the rake planes; the location by a reference point or alternatively by the distance of the plane from the origin of the selected coordinate system. If the rake face is described, for example, by a cone, the orientation can be described by the direction of the axis of rotation of the cone and the aperture angle of the cone and the location by the position of the cone tip.

In order, for example, to determine the location and orientation of a rake plane, it is sufficient to measure three points that unambiguously determine the plane. To increase the accuracy of the determination, it is, however, also possible to measure more than three points.

It is sufficient to measure two points to determine the location and orientation of a cone assumed as oriented concentrically to the spindle axis, for example. More points can also be measured here to improve the accuracy.

The present disclosure therefore provides determining the location and the orientation of the rake face as a possible application. This determination has to take place such that the location and the orientation of the rake face with respect to the associated skiving wheel tooth are known. For this purpose, the location of the skiving wheel tooth is determined in the axial direction and/or the rotational position of the skiving wheel tooth is determined, optionally additionally with the measurement unit. A determination of the axial location of the skiving wheel tooth or of a plurality of or of all the skiving wheel teeth is in particular necessary with conical skiving wheels. The axial location can be understood as the position of a face section of the skiving wheel in which the skiving wheel teeth have a specific tooth thickness. This tooth thickness is the same in all face sections for cylindrical skiving wheels so that a determination of the axial location of the skiving wheel tooth is neither possible nor necessary; however for conical skiving wheels, for example, this tooth thickness changes from face section to face section.

It is sufficient to measure a flank at one point to determine the rotational position of the skiving wheel tooth. If, for example, the axial location is to be determined with a conical skiving wheel, at least two points are to be measured to determine the tooth thickness in a face section.

If the rake face relative to the skiving wheel tooth is determined, the cutting edge can be determined by calculation by cutting the rake face with the flanks of the skiving wheel.

The geometry of the flanks can either be take over in accordance with the drawing or can optionally likewise be determined in the manufacturing machine by a profile measurement and/or by a tooth trace measurement. The cutting edge thus determined can then be used, for example, to set the machining kinematics such that both the tooth thickness and the profile angle at the left and right flanks of the workpiece are within the tolerance. A check can optionally additionally be made whether the effective clearance angle and/or the effective rake angle is/are within desired limits in the machining kinematics thus determined. If the clearance angle is outside the tolerance, the machining can optionally not be continued and the skiving wheel can be expelled or removed again to avoid damage to the skiving wheel and/or to the workpiece.

Example 2

An extension of the last example provides that the outside diameter of the skiving wheel is measured in addition to the location and orientation of the rake face. In particular when the skiving wheel is conical, it can be of advantage to measure the outside diameter at a plurality of axial positions of the skiving wheel and thus to determine the enveloping cone. This enveloping cone or enveloping cylinder in the event of a cylindrical skiving wheel can be utilized to determine that part of the rake face by a section with the rake face that produces the base region of the workpiece and thus to determine the base contour generated in the skiving process and in particular to determine the root radius produced. If the root radius is not generated within the desired tolerance by the machining kinematics determined in Example 1, an attempt can either be made by means of a compensation calculation by varying the available degrees of freedom of the machining kinematics to determine a machining kinematics such that the tooth thickness, the profile angle, and the root radius are within the respective desired tolerance or, if this is not possible, the machining with this skiving wheel can initially be stopped.

If the machining was provided as a two flank machining, a check can optionally be made, for example by means of a simulation, whether it is possible with this skiving wheel within the framework of a single flank machining to achieve both the tooth thickness and the profile angle on the left and right flanks and the root radius within the desired tolerance. If this is possible, the machining can be carried out automatically or on one flank after confirmation by the operator. A check can also optionally additionally made here whether the effective clearance angle and/or the effective rake angle is/are within desired limits in thus determined machining kinematics and the machining is optionally not continued.

Example 3

A simplified variant of Example 1 provides only determining the location of the rake face, that is in particular the reground state of the skiving wheel. This changes after the regrinding and is not exactly known in all cases. This variant can be utilized when the orientation of the rake face is achieved so well during regrinding that the error arising due to the deviation from the desired orientation at the cutting edge produces a deviation in the profile and/or in the tooth thickness of the workpiece that is within a desired tolerance. It is sufficient here to only measure the rake face at one point.

Example 4

If workpieces already having teeth are further machined by gear skiving, it is important to pair the skiving wheel and the workpiece, i.e. to determine the coupling position, such that the desired removal is achieved on the left and right flanks. To ensure this exact pairing, both the rotational position of the workpiece and the rotational position of the skiving wheel must be known as exactly as possible. The rotational position of the workpiece can be determined, for example, by means of a threading sensor or of a measurement unit for measuring or checking the workpiece. The skiving wheel can be measured in the manufacturing machine to determine the rotational position of the skiving wheel in accordance with the present disclosure and the rotational position can thus be exactly determined.

This measurement can optionally be carried out every time when a skiving wheel is received via the tool mount, in particular also when this reception takes place in an automated manner, for example via a tool changer. If, however, the tool mount has sufficient repeat accuracy as regards the rotational position of the skiving wheel, it can also be sufficient only to measure each skiving wheel once and to make use of the last measurement result when it is again received in the machine. The pairing with high accuracy is in particular of special importance when only a little material is to be removed such as during hard skiving.

Example 5

A further application in which the exact pairing and thus the rotational position of the skiving wheel is important is location-oriented gear cutting. The gearing at the workpiece is generated in a fixedly predefined angular position. This can be defined, for example, via a groove or via a bore at the workpiece or via a further gearing at the workpiece. The gearing can in particular be a herringbone gear.

It is naturally possible to increase the number of points to be measured specified in the examples to improve the measurement accuracy by better statistics.

Statements that can be of relevance for a plurality of the above-described examples can be found in the following with respect to the Figures, in particular FIGS. 4 to 6.

If machining kinematics and/or workpiece profiles generated using a known skiving wheel and known machining kinematics, workpiece tooth traces, angular position of the generated gearing, and the clearance angle and rake angle are to be determined in the examples, this can be done, for example, using the production simulations typically used today. Such production simulations are typically based on a removal simulation. The material is determined at the workpiece that is removed by a given tool, in particular by given cutting edges at the tool, during the machining with given machining kinematics. In the case of the gear skiving observed here, the total produced gap can thus be determined.

To determine machining kinematics for generating a predefined workpiece profile and/or tooth thickness using a given skiving wheel having a known cutting edge, the influences of the axes available in the machining on the workpiece profile and/or tooth thickness can be determined within the framework of the production simulation by varying the axes. It can thus be determined, for example, how the profile angles at the workpiece change on the left and right sides if the axial cross angle is adjusted by 0.1° in that the production simulation is carried out using this adjusted axial cross angle and in that the profile angle of the generated gap is determined from the simulation result. If the influences of all the axes adjustable for the machining on all the geometrical parameters at the workpiece to be corrected are known the machining kinematics can be corrected under the assumption of a linear correlation between the axes and these parameters. The production simulation can be carried out again using these corrected machining kinematics and the remaining errors can be determined and optionally corrected again and iterated for so long until the geometrical parameters are within a predefined tolerance.

The machining kinematics in gear skiving will be described by the following parameters now described in more detail, but also known from the general literature and publications on gear skiving.

The coupling ratio between the tool spindle axis and the workpiece spindle axis is given by the tooth number ratio of the tool and the workpiece and describes the ratio of the tool spindle and the workpiece spindle speed during the machining, but still without taking the axial feed along the workpiece into account.

The differential feed describes the additional rotation of the workpiece determined by the axial feed along the workpiece due to the lead of the workpiece. This additional rotation is necessary to generate the helix angle at the workpiece.

The coupling position describes a set of values for the rotational position of the tool spindle, for the rotational position of the workpiece spindle, and the position in the axial direction. In the variant shown by way of example in FIG. 1 of an apparatus for gear skiving, this would be a set of values for the axes C1, C2, and Z1. It is fixed by this coupling position where exactly the gap is generated by the gear skiving process at the workpiece, i.e. at which angular position.

The center distance describes the distance between the tool spindle axis and the workpiece spindle axis. The center distance is substantially implemented by the X1 axis in the variant of an apparatus for gear skiving shown by way of example in FIG. 1, with a pivoting about A2 and a travel along V1 also influencing the center distance.

The axial cross angle is here defined as the angle by which the tool spindle is inclined with respect to the workpiece spindle. In variant of an apparatus for gear skiving shown by way of example in FIG. 1, this corresponds to the position of the A1 axis.

The rake face offset denotes a shift of the tool along the tool spindle axis. In the variant of an apparatus for gear skiving shown by way of example in FIG. 1, this can be implemented by a combination of a traveling of the Z1 and V1 axes.

The relative location of the measurement unit to the tool spindle in the manufacturing machine is generally not exactly known. It can thus in particular change in time by thermal growth of the machine. To be able to compensate such thermal growths, it can be necessary to carry out a calibration of the measurement unit. It can in particular be important to calibrate the distance of the measurement unit from the tool spindle axis, in particular of the measurement sphere center from the tool spindle axis. For this purpose, for example, a ground inspection collar having a known diameter can be provided on the skiving wheel and/or on the tool holder and/or on the tool spindle and is measured by the measurement unit. If, for example, a measuring sensor is used that works in a switching manner, the inspection collar can be sensed with it. The distance between the measurement unit and the tool spindle axis can be determined from this and the measurement unit can be correspondingly calibrated. The distance between the measurement sphere and the tool spindle axis can in particular thereby be determined. Alternatively to an inspection collar produced specifically for this purpose, a cone of a chuck can also be used for mounting the skiving wheel for calibration.

In the event that such an inspection collar and/or cone is not present or cannot be traveled to, the present disclosure provides a further method for determining the relative location between the measurement sphere center and the tool spindle axis. The fact is utilized that an error in the relative location between the measurement sphere center and the tool spindle axis in a measurement of the profile of the skiving wheel teeth results in an error in the measured profile, in particular in the measured profile angle. If the profile of the skiving wheel teeth is known, a measurement of the profile can be carried out in the machine, the measured profile can be compared with the actual profile of the skiving wheel teeth, and errors in the relative location between the measurement sphere center and the tool spindle axis can be determined from the deviation.

This determination will be outlined in the following for the arrangement shown by way of example in FIG. 4.

Figure 4:
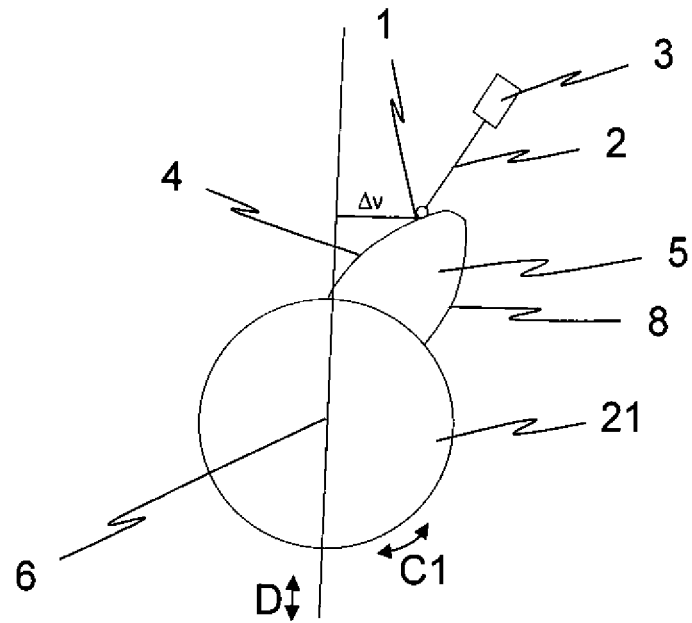
FIG. 4 shows a sketch in which the apparatus in accordance with the present disclosure carries out a calibration of the measurement unit and the skiving wheel.

FIG. 4 shows an exemplary arrangement of axes in the sense of the present disclosure for traveling the skiving wheel in the manufacturing machine and a skiving wheel in which only one tooth 5 is shown for simplification. FIG. 4 furthermore shows a measurement sensor 3 working in a switching manner with a measuring probe 2 and a measurement sphere 1. The C1 axis corresponds to the tool spindle axis 6; the D axis serves the optionally linear traveling of the skiving wheel and thus inter alia serves the changing of the relative location between the measurement sphere center and the tool spindle axis. The measuring probe 2 does not have to be aligned in parallel with the D axis. The offset $\Delta V$ that describes the position of the measurement sphere in a direction perpendicular to the D axis is generally also not exactly known and may likewise be determined with the method described here. A measurement sphere having a diameter 0 is assumed in the following to limit the description of the idea behind the calibration to the essential. In this simplified case, the measurement sphere center also corresponds exactly to the contact point between the measurement sphere and the tooth flank. In practice, the contact point has to be determined, as is generally known from metrology, from the measurement sphere center while taking account of the measurement sphere diameter and of the normal vector of the tooth flank at the contact point.

Figure 5:
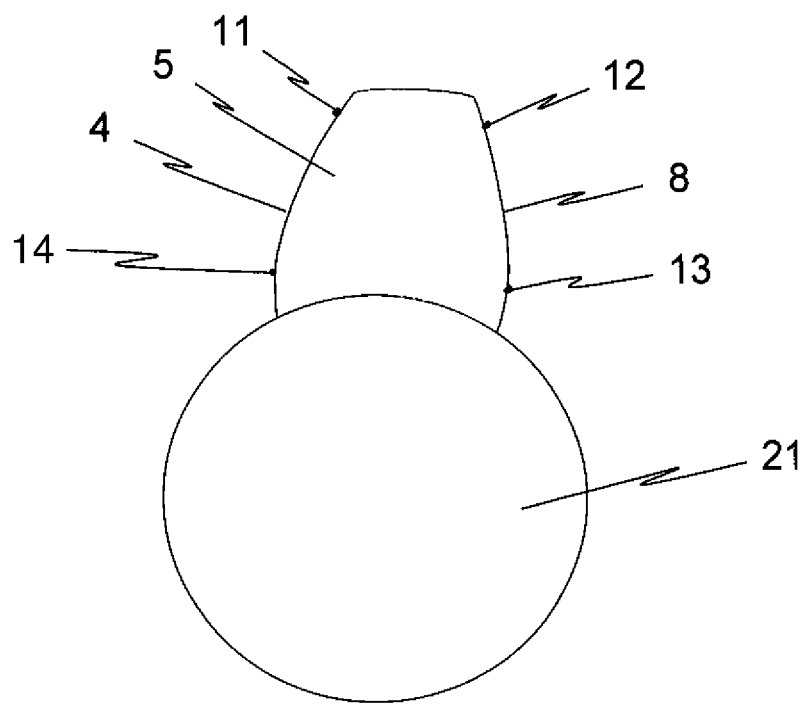
FIG. 5 shows a representation of the skiving wheel.
Figure 6:
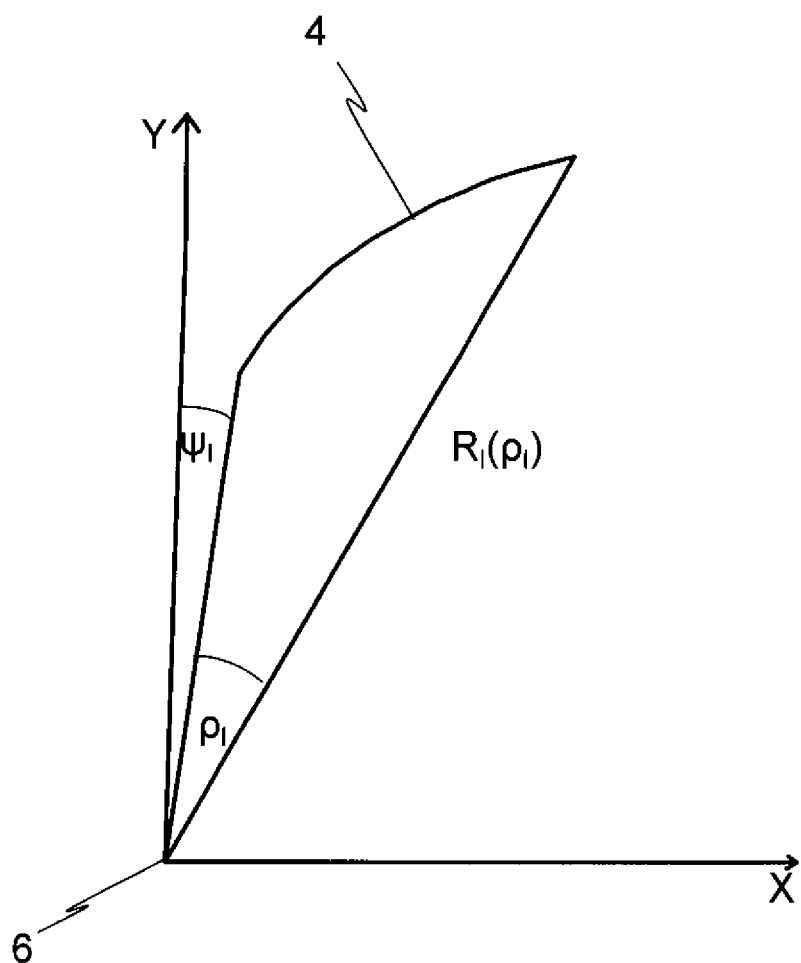
FIG. 6 shows a representation of profiles of the left and right flanks of the skiving wheel in polar coordinates.

For the calibration, the four points 11 to 14 of FIG. 5 are probed one after the other by the measurement sphere and the respective positions read from the measurement systems of the axes C1 and D at the time of the contact are recorded. These positions are designated in the following as $C1_{11}$, $C1_{12}$, $C1_{13}$, and $C1_{14}$ or $D_{11}$, $D_{12}$, $D_{13}$, and $D_{14}$. The four points can be freely selected within certain limits; two points on a left flank and two points on a right flank may be sensed, with a respective point in the proximity of the addendum and a further point in the proximity of the dedendum being sensed on each flank. The points do not have to be impacted exactly, which would also not even be possible due to the not exactly known relative location between the measurement sphere center and the tool spindle axis and due to the not exactly known offset $\Delta V$.

The points can be on different skiving wheel teeth, but it is also possible, as shown in FIG. 5, to select the left and right flanks of the same skiving wheel tooth. It is assumed that the profile of the skiving wheel tooth is known with a high accuracy. This is the case as a rule with skiving wheels since they are ground with high precision. The profiles $V_l(\rho_l)$ and $V_r(\rho_r)$ of the left and right flanks respectively can be described as follows in polar coordinates:

$$V_l(\rho_l) = R_l(\rho_l)\begin{pmatrix}\cos(\rho_l + \psi_l) \\ \sin(\rho_l + \psi_l)\end{pmatrix} \quad (1)$$

$$V_r(\rho_r) = R_r(\rho_r)\begin{pmatrix}\cos(\rho_r + \psi_r) \\ \sin(\rho_r + \psi_r)\end{pmatrix}$$

where $\rho_l$ or $\rho_r$ is the polar angle $R_l(\rho_l)$, or $R_r(\rho_r)$ the radius in dependence on the polar angles and the initially unknown angles $\psi_l$ and $\psi_r$ describe the rotational position of the flanks. See FIG. 6. The four times two equations result from the four sensing procedures;

$$R_l(\rho_{l1})\begin{pmatrix}\cos(\rho_{l1} + \psi_l + C1_{11}) \\ \sin(\rho_{l1} + \psi_l + C1_{11})\end{pmatrix} = \begin{pmatrix}\Delta D + D_{11} \\ \Delta V\end{pmatrix} \quad (2)$$

$$R_l(\rho_{l2})\begin{pmatrix}\cos(\rho_{l2} + \psi_l + C1_{12}) \\ \sin(\rho_{l2} + \psi_l + C1_{12})\end{pmatrix} = \begin{pmatrix}\Delta D + D_{12} \\ \Delta V\end{pmatrix} \quad (3)$$

$$R_r(\rho_{rl3}) \begin{pmatrix} \cos(\rho_{rl3} + \psi_r + C1_{13}) \\ \sin(\rho_{rl3} + \psi_r + C1_{13}) \end{pmatrix} = \begin{pmatrix} \Delta D + D_{13} \\ \Delta V \end{pmatrix} \quad (4)$$

$$R_r(\rho_{rl4}) \begin{pmatrix} \cos(\rho_{rl4} + \psi_r + C1_{14}) \\ \sin(\rho_{rl4} + \psi_r + C1_{14}) \end{pmatrix} = \begin{pmatrix} \Delta D + D_{14} \\ \Delta V \end{pmatrix} \quad (5)$$

where $\Delta D$ describes the error sought within the framework of the calibration in the spacing between the measurement unit and the tool spindle axis and the four angles $\rho_{l11}$, $\rho_{l12}$, $\rho_{r13}$, $\rho_{r14}$ describe the polar angles of the points on the left or right flanks at which the measurement sphere actually contacted the flanks.

These eight equations in total describe an equation system in the eight unknowns $\rho_{l11}$, $\rho_{l12}$, $\rho_{r13}$, $\rho_{r14}$, $\psi_l$, $\psi_r$, $\Delta D$, and $\Delta V$ which can generally only be numerically resolved.

It is likewise possible to utilize more than the two axes D and C1 used here to bring about a contact between the measurement sphere and the tooth flank if further axes are available for this purpose. In the event that the measurement unit is attached to the counter column, the axes X1, and V1, and C1 can be used, for example.

To increase the accuracy of the calibration, it is possible to measure more than four points distributed over one or more skiving wheel teeth; a plurality of points can in particular be recorded by the use of a measuring probe or by an optical method, they can in particular also be distributed over a plurality of or over all skiving wheel teeth. An equation system having more equations than unknowns and that is thus overdetermined thereby results. $\Delta V$ and $\Delta D$ can then furthermore be determined within the framework of a compensation calculation. It is also possible only to determine $\Delta V$ or only $\Delta D$ in a simple variant. Only the four equations for the left or right flanks are selected from the equation system for this purpose, which produces an equation system having four unknowns. A point on the tool mount can be sensed, for example, for a calibration in the axial direction of the tool spindle axis.

The invention claimed is:

1. A method for skiving a gear workpiece, wherein:
in a first step, one or more geometrical parameters of a geometry of a tool are measured for machining of a gear workpiece, where the tool is in a clamped state in a gear machining apparatus,
the gear machining apparatus comprising a machining head, a tool mount, and a machine table, wherein the tool is mounted on the machining head via the tool mount, and wherein the gear workpiece is mounted on the machine table; and
in a subsequent further step, machining kinematics are determined for the skiving of the gear workpiece in dependence on the measured one or more geometrical parameters of the geometry of the tool,
wherein determining the machining kinematics includes determining machining kinematics parameters, the machining kinematics parameters including one or more of a coupling position, a center distance, an axial cross angle, and a rake face offset parameters, and
wherein a location of a cutting edge of the tool is determined in the first step, based on a position of the tool in the tool mount in the gear machining apparatus.

2. The method in accordance with claim 1, wherein a spatial extent of the cutting edge is determined in the first step in addition to determination of the location in the first step, and wherein the spatial extent of the cutting edge is based on where a z axis coincides with an axis of rotation of the tool and with a tool spindle axis during machining.

3. The method in accordance with claim 1, wherein the tool is a skiving wheel and wherein the one or more geometrical parameters are measured at the skiving wheel, the one or more geometrical parameters including one or more of
a) an outside diameter of the skiving wheel at one or more axial positions of the skiving wheel, wherein the one or more axial positions of the skiving wheel are based on one or more of a spatial distance of the cutting edge relative to contact of the skiving wheel on the tool mount and a movement of the machining head relative to the workpiece;
b) a tooth thickness of the skiving wheel at the one or more axial positions of the skiving wheel;
c) a profile line of the skiving wheel;
d) a tooth trace of the skiving wheel;
e) an extent of the cutting edge of the skiving wheel;
f) a location of a rake face and/or an orientation of the rake face; and/or
g) a location of the skiving wheel.

4. The method in accordance with claim 3, wherein a deviation in the tooth thickness of the skiving wheel, in a profile angle of the skiving wheel, and/or in a root radius of the skiving wheel from a desired geometry or from a desired location in the apparatus is compensated by the machining kinematics, and/or wherein an angular location of a skived gap is directly predefined in the gear workpiece.

5. The method in accordance with claim 3, wherein the machining kinematics are determined and/or corrected in dependence on the measured one or more geometrical parameters of the skiving wheel and remain constant during a machining stroke.

6. The method of claim 3, wherein the location of the rake face and/or the orientation of the rake face includes a rake angle of the rake face and a step angle of the rake face.

7. The method of claim 3, wherein the skiving wheel is located on a spindle having an axis, and wherein the location of the skiving wheel includes a rotational position of the skiving wheel with respect to the skiving wheel spindle axis.

8. The method of claim 3, wherein the skiving wheel is located on a spindle having an axis, and wherein the location of the skiving wheel includes a rotational position of one or more teeth on the skiving wheel with respect to the skiving wheel spindle axis.

9. The method in accordance with claim 1, wherein the machining kinematics are determined and/or corrected in dependence on the measured one or more geometrical parameters of the tool and on an axial feed position of the gear workpiece, and wherein the axial feed position of the gear workpiece is substantially parallel to an axis of rotation of the tool.

10. The method in accordance with claim 1, wherein the machining kinematics are determined and/or corrected in dependence on the measured one or more geometrical parameters of the tool and remain constant during a machining stroke.

11. The method in accordance with claim 1, wherein an evaluation is made via a check, wherein the evaluation via the check determines whether a predefined production tolerance is observed with a skiving wheel and the machining kinematics and/or whether technological parameters are within a predefined range, wherein corresponding workflows are output by a machine in dependence on a result of the check, and wherein the check includes performing a simulation and calculating values for gear teeth from measurement results that are based on sensor output.

\* \* \* \* \*